Figure 3:
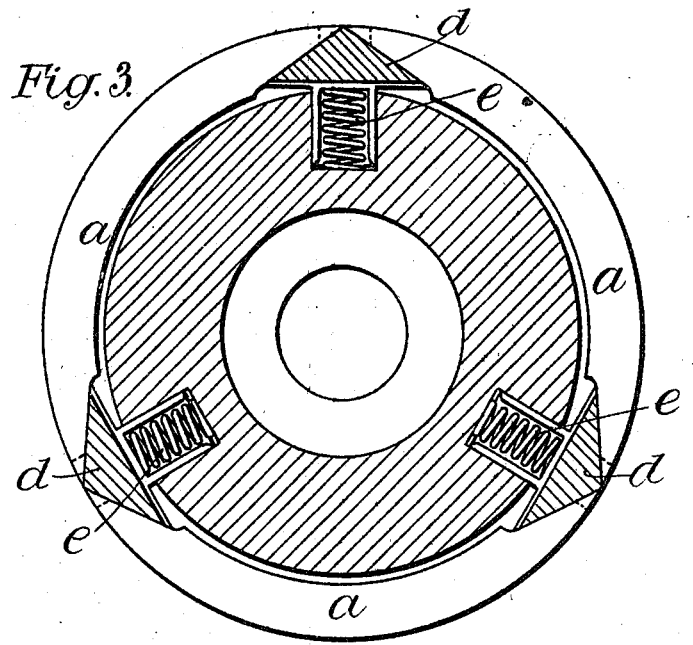

R. ALLEN.
PISTON AND PISTON VALVE.
APPLICATION FILED FEB. 19, 1909.
965,355.
Patented July 26, 1910.
9 SHEETS—SHEET 1.
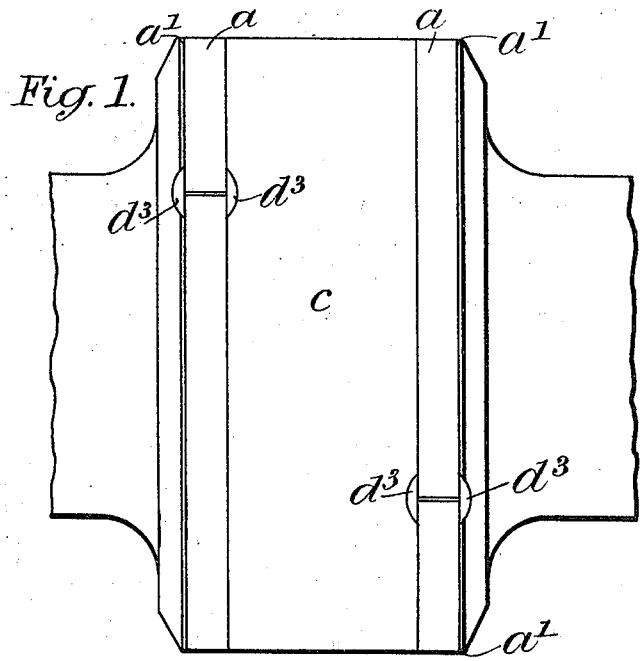
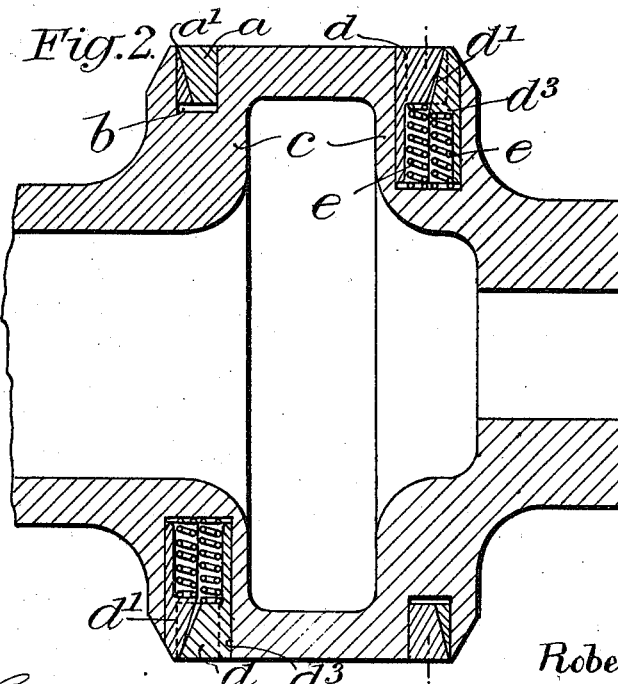
Witnesses.
Inventor
Robert Allen
By H. B. Willson & Co.
Attorneys.

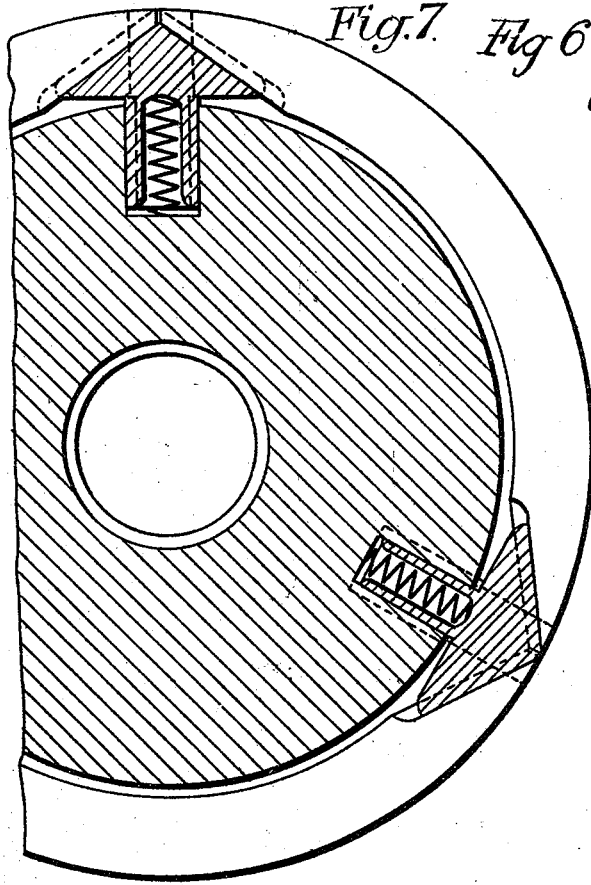
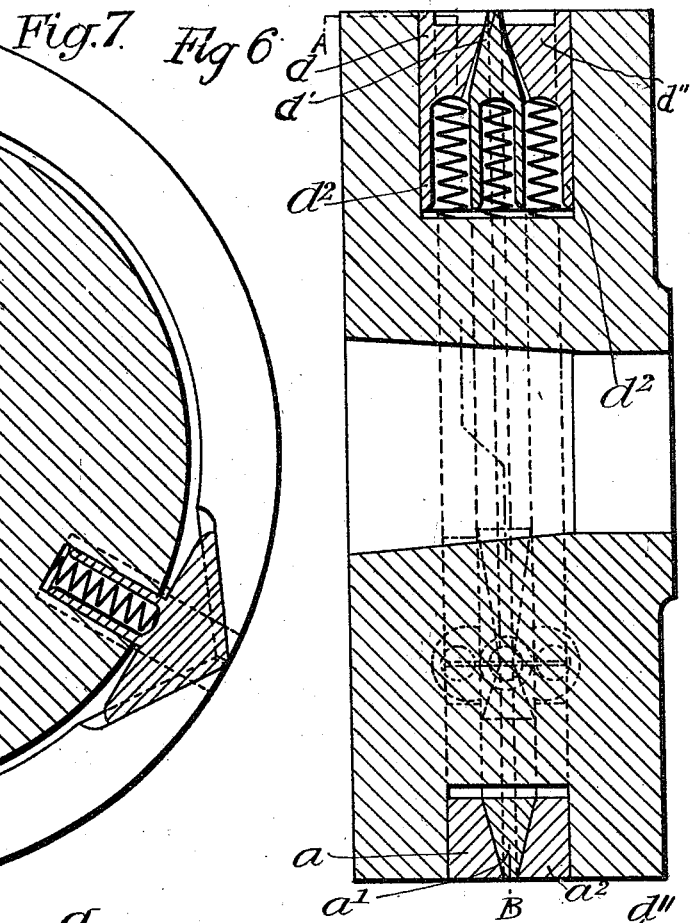
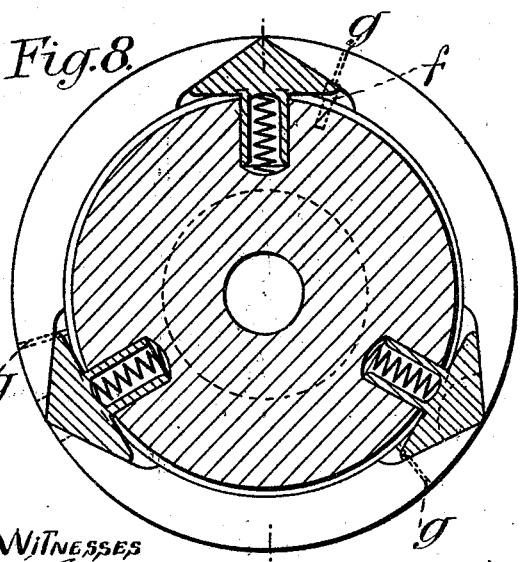
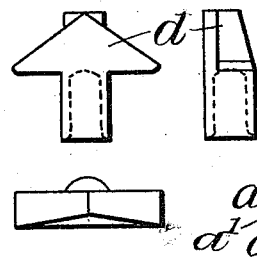

R. ALLEN.
PISTON AND PISTON VALVE.
APPLICATION FILED FEB. 19, 1909.
965,355.
Patented July 26, 1910.
9 SHEETS—SHEET 4.
Fig. 11.
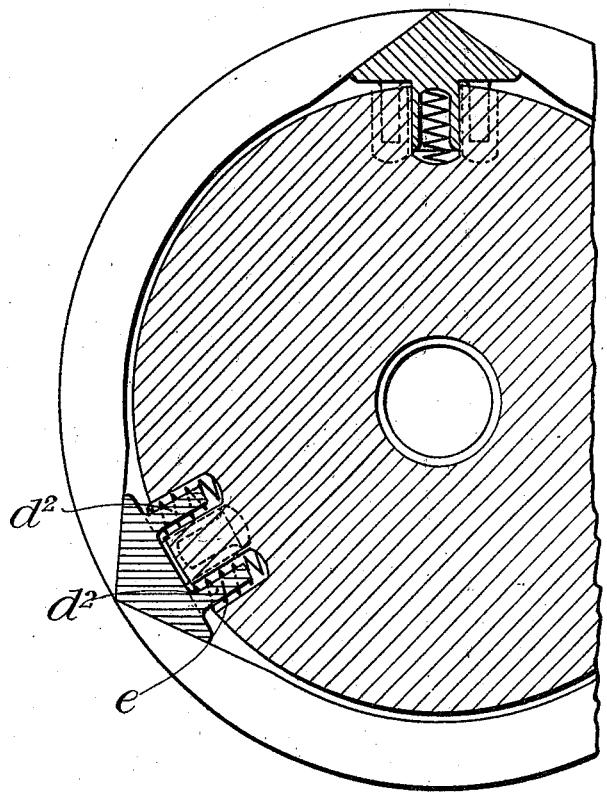
Fig. 12.
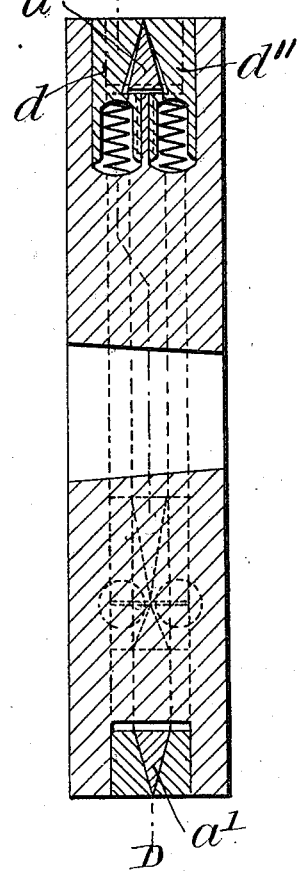
Fig. 13. Fig. 13ª
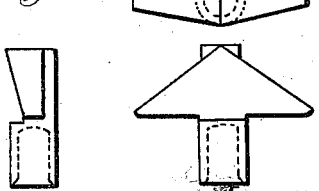
WITNESSES
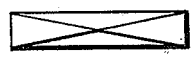
INVENTOR
Robert Allen
By H. B. Willson &Co
ATTORNEYS.

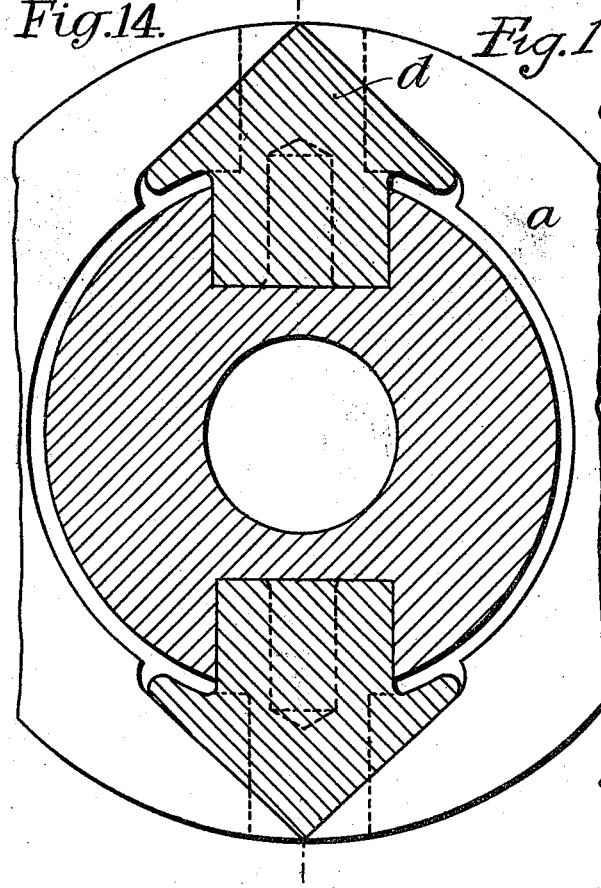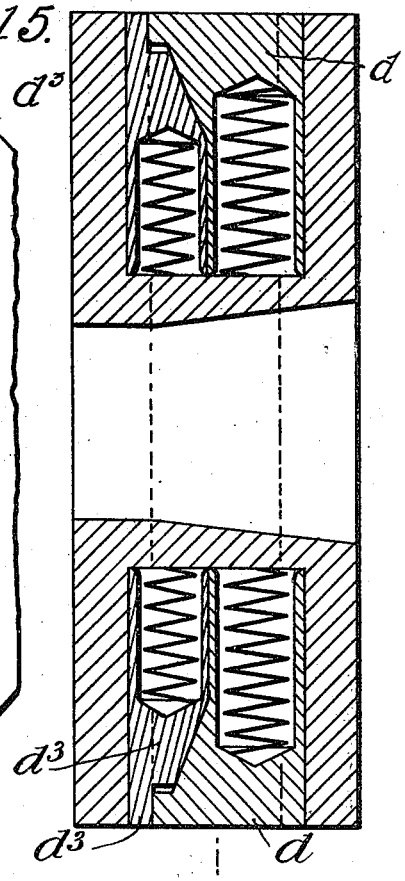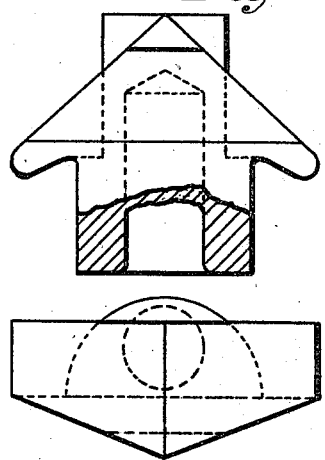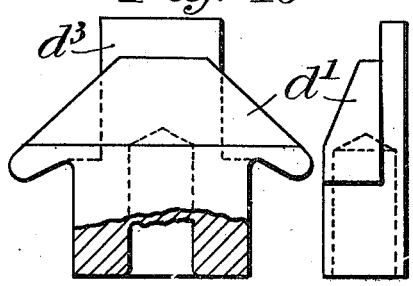

R. ALLEN.
PISTON AND PISTON VALVE.
APPLICATION FILED FEB. 19, 1909.

965,355.

Patented July 26, 1910.
9 SHEETS—SHEET 6.

WITNESSES.

INVENTOR
Robert Allen
By H. B. Willson & Co.
ATTORNEYS.

R. ALLEN.
PISTON AND PISTON VALVE.
APPLICATION FILED FEB. 19, 1909.
965,355.
Patented July 26, 1910.
9 SHEETS—SHEET 7.
Fig. 21.
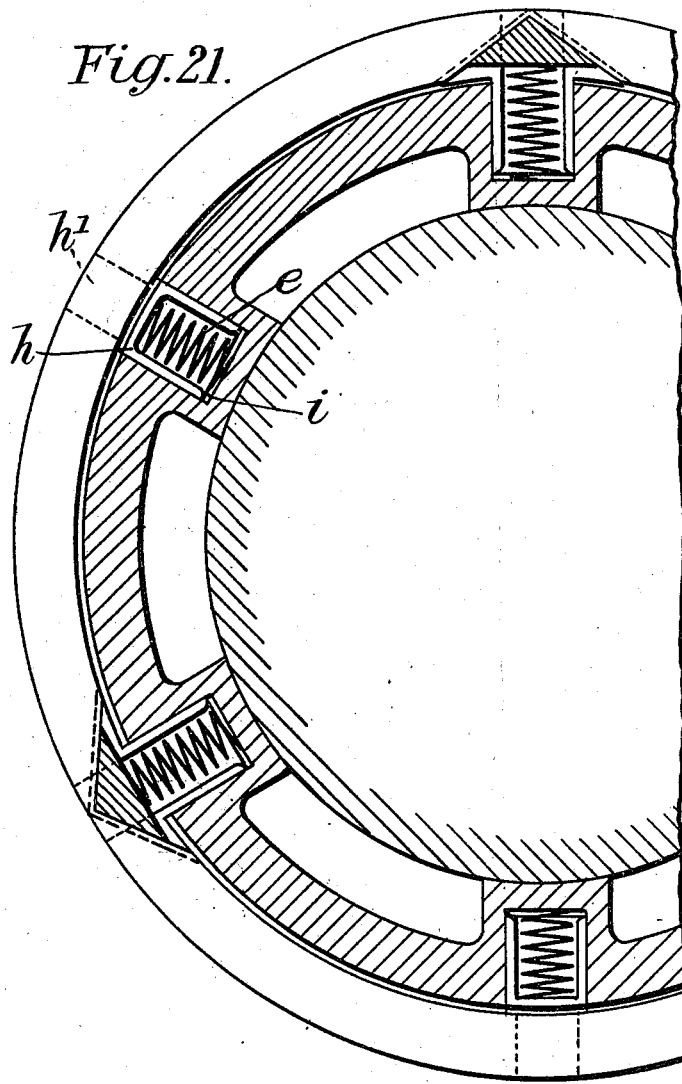
Fig. 22.
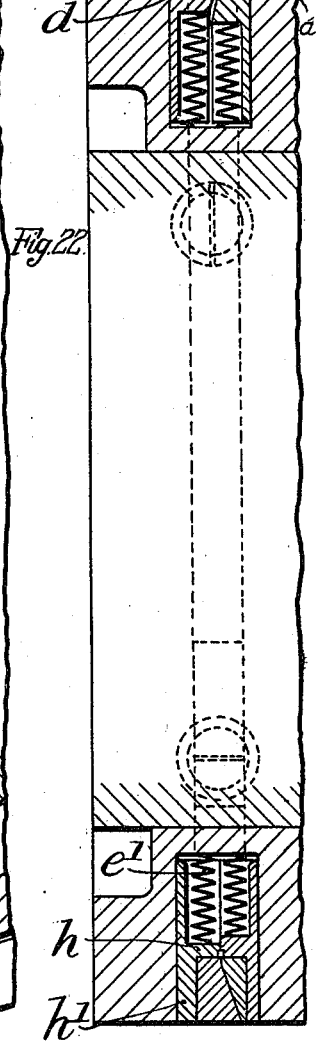
Fig. 24.
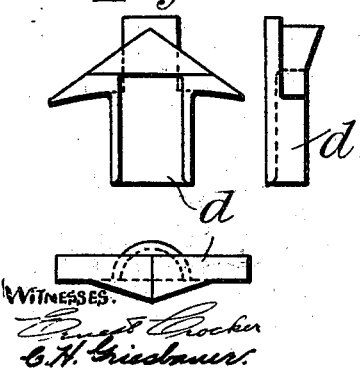
Fig. 23.
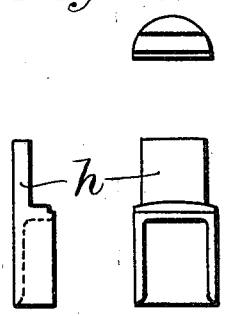
Fig. 24ª
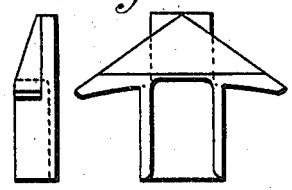
WITNESSES.
INVENTOR
Robert Allen
By H. B. Wilson & Co.
ATTORNEYS

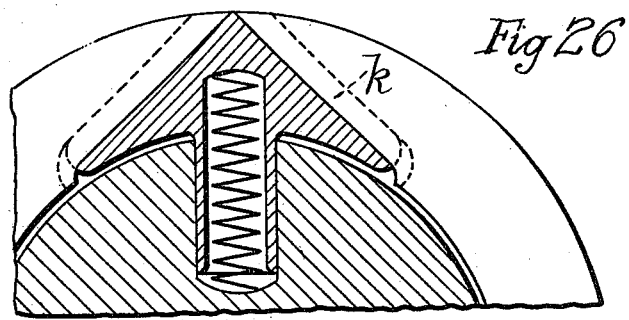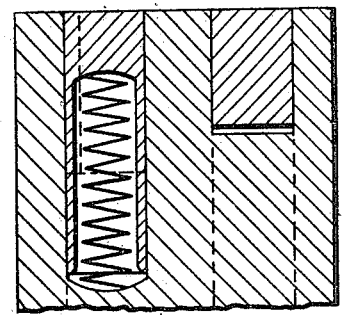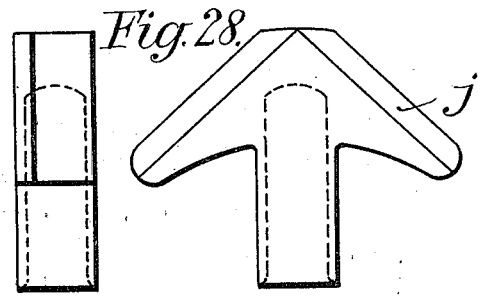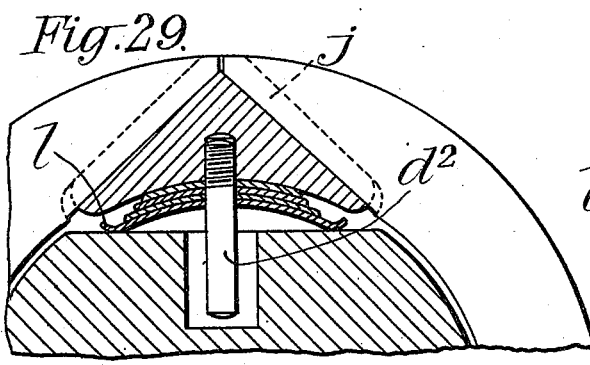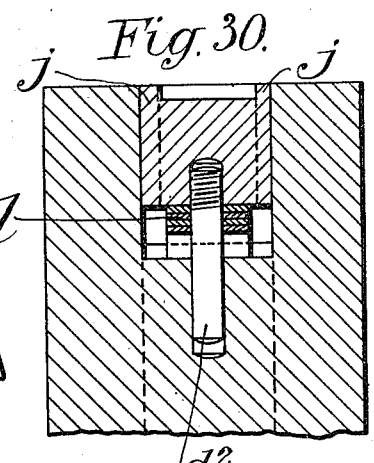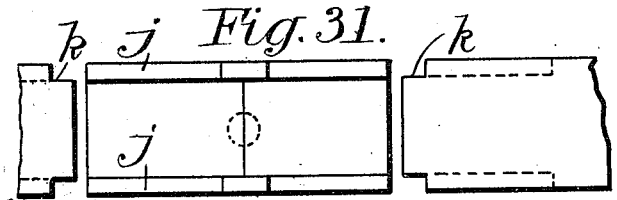

R. ALLEN.
PISTON AND PISTON VALVE.
APPLICATION FILED FEB. 19, 1909.
965,355.
Patented July 26, 1910.
9 SHEETS—SHEET 9.
Fig. 32. Fig. 33.
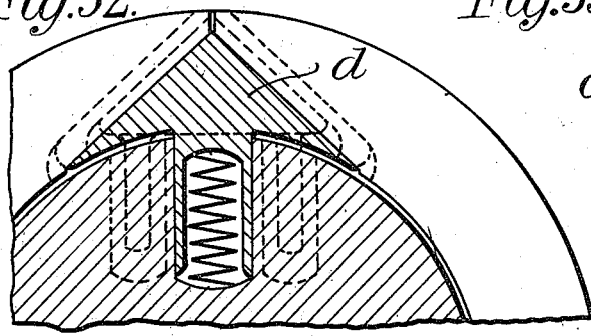
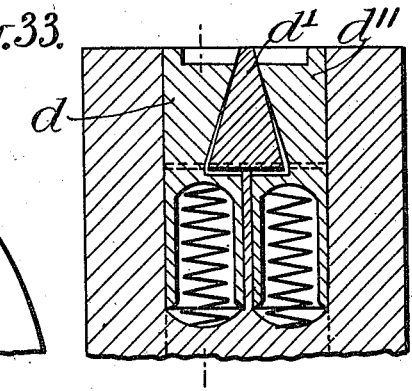
Fig. 36. Fig. 37.
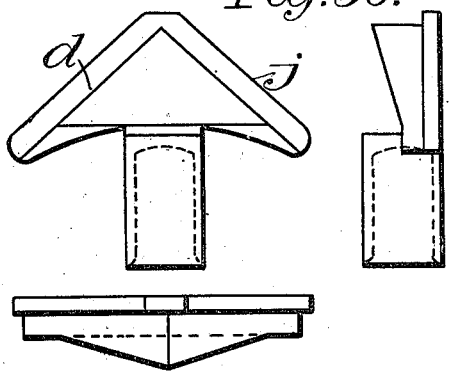
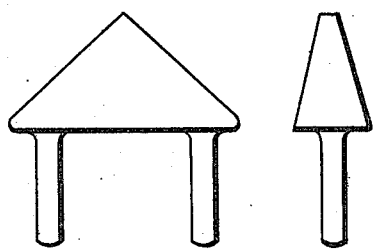
Fig. 34. Fig. 35.
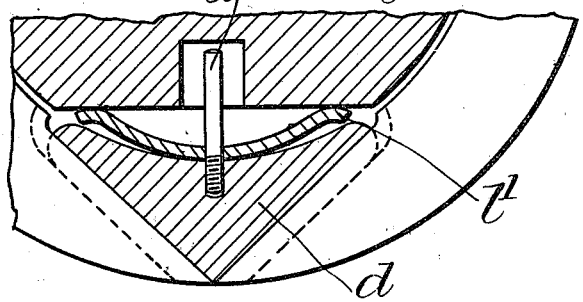
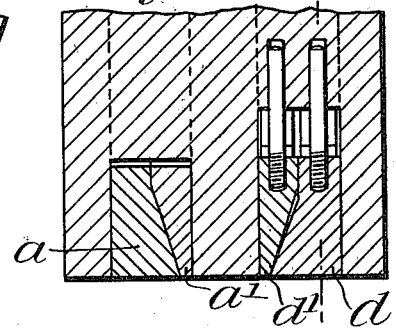
Fig. 38.
Witnesses.
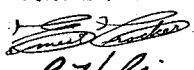
Inventor
Robert Allen.
By
Attorneys.

UNITED STATES PATENT OFFICE.

ROBERT ALLEN, OF CAVERSHAM, ENGLAND.

PISTON AND PISTON-VALVE.

965,355.  Specification of Letters Patent.  Patented July 26, 1910.

Application filed February 19, 1909. Serial No. 478,939.

*To all whom it may concern:*

Be it known that I, ROBERT ALLEN, a subject of the King of Great Britain and Ireland, residing at "Oakdene," Kidmore Road, Caversham, Oxfordshire, England, have invented certain new and useful Improvements in Pistons, Piston-Valves, or the Like, of which the following is a specification.
This invention for improvements in pistons, piston valves or the like relates to pistons of the kind wherein packing rings are expanded against the walls of the cylinder by radial wedges or chokes inserted at the joints in the rings and forced outward by springs, each ring having one or more wedged joints as desired. When two or three rings of this type are arranged side by side in a single groove, it is sometimes advantageous to arrange the joints and wedges of one ring opposite the joints and wedges of the adjacent ring or rings to enable the adjacent rings to move in unison in the same direction. In order to effect this with wedges or chokes having hollow shanks for the reception of helical springs in some cases I flatten the coils of the springs along one side and cut away the inside of the shank of each wedge and the usual extension to the top of the wedge on that side and where necessary interpose a thin plate to prevent the springs of adjacent shanks from coming in contact with each other. Where three wedges are required at each joint the shank of the middle wedge need not be cut away and the separating plates or partitions are dispensed with. By flattening the springs and cutting away the shanks or other parts as described the wedges can be snugly fitted side by side in the groove and will properly close the joints in the rings.

Alternatively the helical coils have two flat sides or they may be made circular and of reduced diameter to fit small bores made in wedge shanks having flattened inner sides.

In a modified form of construction more particularly adapted for use in confined or small spaces such as for instance in motor pistons and small piston valves, I force the wedges outward by plate or laminated springs arranged between the shank of the wedge and the bottom of the groove in the piston head. The shank in this case is formed as short as possible and may be bored to receive a guide pin on the center of the spring which keeps the spring in place. The bottom of the groove behind each spring may be flattened and also bored to receive a guide pin fixed in the center of the spring.

In a further modified form of construction the springs are formed by suitably bending at intervals in its length a continuous strip of steel adapted to be laid in the packing ring groove.

In order to prevent interlocking of the wedges to allow adjacent rings to expand independently a soft metal packing or lining is interposed between adjacent faces of opposed wedges. Or the adjacent lateral wedging faces of pairs of opposed wedges are cut at different angles so that a clearance is left between the faces at the bases of the wedges.

In large rings supporting plugs located in radial pockets in the bottom of the packing ring grooves and forced outward by springs after the manner of the wedges, are arranged under the packing ring sections and provided with segmental extensions which pass up by the side of the ring to enable the plugs to be readily pressed inward from the outside when the rings are in position.

Figure 4:
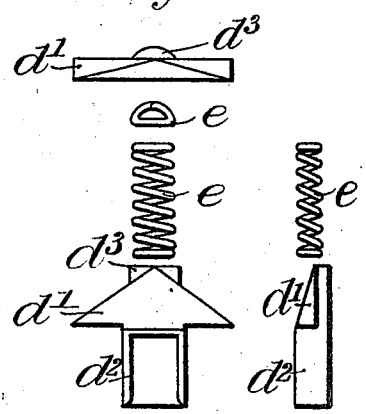
Figure 5:
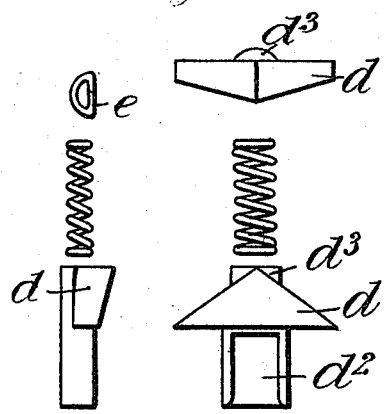
Figure 17:
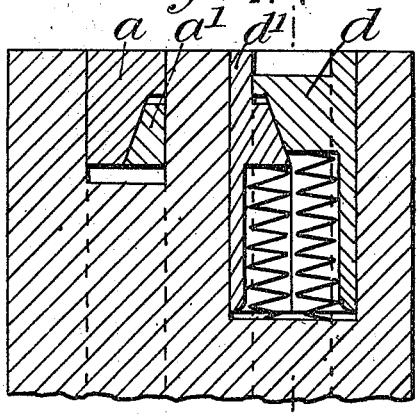
Figure 18:
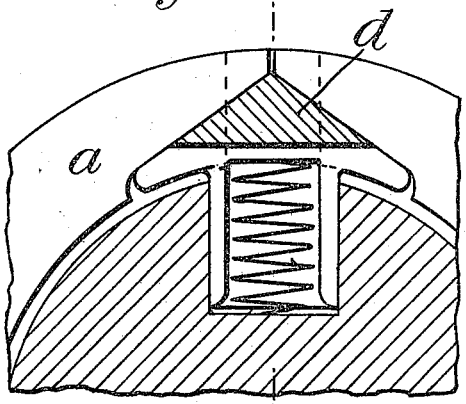

In the accompanying drawings Figures 1 to 3 illustrate in elevation longitudinal section and transverse section respectively a piston valve with packing constructed according to this invention, Figs. 4 and 5 are detail views of the wedges or chokes and their springs, Figs. 6 and 7 are longitudinal and transverse sections respectively of a piston head provided with a triple ring packing requiring three wedges at each joint, the section Fig. 7 being taken at A, B Fig. 6, Figs. 8 and 9 are transverse and longitudinal sections through a piston head provided with a triple ring packing requiring two wedges at each joint, and Fig. 10 illustrates details of the wedge used in this joint, Figs. 11, 12 and 13 are similar views to Figs. 8 to 10 showing a modified arrangement where three wedges are used at each joint, Fig. 11 being a section at C—D Fig. 12. Fig. 13ª illustrates the side wedges in detail, Figs. 14 to 16 are similar views to Figs. 8 to 10 illustrating a modified form of packing, in which one of each pair of adjacent wedges projects across the flattened tip of the other wedge, Fig. 16ª illustrates one of the wedges in detail, Figs. 17, 18, and 19, 20 are sections taken at right angles through portions of piston heads showing wedges in which the tip of the wedge portion does not extend to the perimeter of the packing ring. Figs. 21, and 22 are transverse and longitudinal sections respectively through a piston head fitted with the improved packing with supporting plugs for large pistons. Figs. 23, 24 and 24ª are detail views, Figs. 25 and 26 are sections at right angles through portions of a piston head and packing showing an improved form of wedge, Fig. 27 is a plan showing the adjacent ends of the two packing segments moved apart with the wedge between them, Fig. 28 illustrates the wedge in detail, Figs. 29 and 30 and 31 are similar views to Figs. 25 to 27 showing a further modified form of wedge and spring, Figs. 32, 33 and 34, 35 are sections at right angles through part of a piston head showing further modified arrangements of packing, and Figs. 36, 37 and 38 are various detail views.

Referring to Figs. 1 to 5 the piston valve here shown is fitted with the segmental undercut packing ring $a$ with its complemental wedging and locking ring $a'$ which in the known manner insures a tight joint between the rings and the sides of the groove $b$ in the head $c$ and prevents the ring $a$ being forced inward by steam pressure when passing over ports. The joints between the segments of both rings $a\ a'$ coincide so that their corresponding expanding wedges or chokes $d\ d'$ are placed together in pairs, and each pair of wedges being forced outward by their springs $e$ in the same direction, their corresponding packing ring segments in expanding are moved in the same direction, thus friction between adjacent wedging surfaces is avoided. Each wedge or choke $d$ or $d'$ comprises the wedge part proper which is shaped to conform approximately to the section of the segment on which it acts, the hollow shank $d^2$ for the reception of the spring $e$ and the integral segmental extension $d^3$ formed by a continuation of the shank up the outer side of the wedge and constituting an effective barrier against the passage of steam through the joint. As shown the shank $d^2$ is partly cut away on the inside and the spring $e$ is correspondingly flattened on that side to enable the wedging parts to lie close together, the adjacent wedging faces being cut so as to leave a slight clearance between the said faces at the bases of the wedges as shown in Fig. 2 to prevent interlocking of the wedges.

In Figs. 6 and 7 three segmental packing rings $a\ a'\ a^2$ are arranged side by side in the same groove and three wedges $d\ d'\ d''$ are provided side by side where the joints occur. In this arrangement the shanks of the outer wedges $d\ d''$ only are cut away as described, but the middle shank is left cylindrical and separates the springs of the other shanks. It will also be noted that the tips of the outer wedging parts proper do not project to the outer perimeter of the ring, so that any tendency to score the cylinder is entirely avoided.

Figs. 8 to 10 illustrate another triple ring arrangement but only two wedges $d\ d''$ are used at the joints, the middle ring $a'$ having no separate wedges. Thus sufficient room is left for the shanks of the outer ring wedges $d\ d'$ which do not require to be cut away. In order to prevent creeping of the middle ring $a'$ a pin $f$ is inserted in an opening in the bottom of the groove at one of the joints $g$ between the ring segments and projects between the ends of the segment.

In the slightly modified wedge arrangement shown in Figs. 11 to 13ª the middle ring $a'$ of a triple ring packing is expanded by a wedge $d'$ provided with two solid shanks $d^2$ so arranged as to leave room between them for the shanks of the outer wedges $d\ d''$ so that these need not be cut away on the inside. In this case the springs $e$ are coiled around the shanks $d^2$.

In Figs 14 to 18 the packing ring $a$ fills the outer part of the groove and is only under cut for a part of its depth to receive the wedging ring $a'$ which is not exposed to the cylinder. The expanding wedges or chokes $d$ of the ring $a$ are likewise under cut to receive and cover the wedging parts of the expanding wedges $d'$ leaving only the segmental extensions $d^3$ of the wedges $d'$ exposed. In Fig. 15 the width of the packing ring shown is such that there is sufficient room in the groove for the shanks of the wedges without cutting these away on the inside, but in Figs. 17 and 18 where the width of the ring is less both shanks are shown cut away on the inside. The tip of the wedge proper $d$ Figs. 17 and 18 does not extend to the outer edge of the joint so that only the side extensions $d^3$ are exposed.

Figure 19:
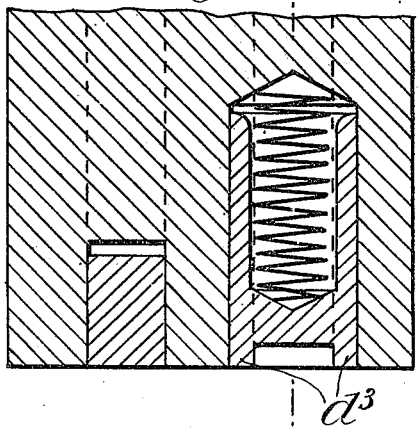
Figure 20:
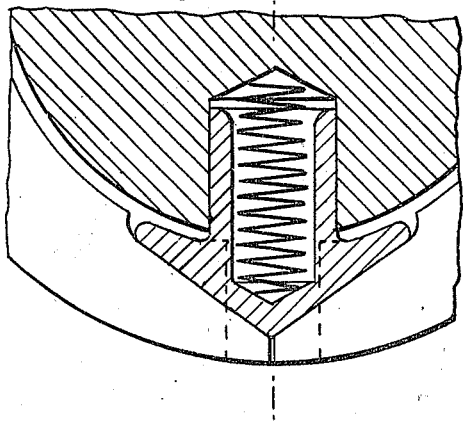

Figs. 19 and 20 show a packing in which the segmental extensions on both sides of the expanding wedge are exposed to the cylinder, but the wedge proper is not so exposed, as the tip does not extend to the peripheral edge of the joint.

In the packing illustrated in Figs. 21 to 24ª the ring segments are supported at the middle by plugs $h$ in addition to the wedges $d\ d'$. These plugs are arranged in pockets $i$ in the bottom of the packing ring groove and forced outward by springs $e'$ in the same manner as the wedges $d\ d'$. Extensions $h'$ in the plugs pass up by the sides of the rings to enable the plugs to be pressed inward independently of the rings when these are in position.

In cases where the segmental extension $d^3$ for closing the joint between the packing ring segments cannot conveniently be formed on the wedge, or cannot conveniently be used, a flange such as $j$ Figs. 25 to 28 or Fig. 31 is formed on one or both sides of the wedge and the packing segments are suitably cut away as at k to accommodate the flange j. The arrangement just described is also convenient where the shank $d^2$ is screwed into the wedge as shown in Figs. 29 and 30. In this case the wedge is forced outward to expand the packing ring by a laminated spring $l$ resting on a flat seat in the bottom of the packing ring groove.

Figs. 32 and 33 show a triple ring packing with three expanding wedges at the joints, the middle wedge $d'$ having two shanks $d^2$ as described with reference to Fig. 11 and each outer wedge $d$ $d''$ being formed with a flange $j$, Figs. 36 and 37. Referring to Figs. 34, 35 and 38 each wedge $d$ $d'$ therein shown is expanded by a single leaf spring $l'$ and are provided with flanges $j$ and screwed in shanks $d^2$ as previously described.

What I claim and desire to secure by Letters Patent is:—

1. In a piston, piston-valve or like packing, a plurality of segmental packing rings, having wedging surfaces on their adjacent faces, and arranged with their joints in axial alinement, a plurality of radial wedges adapted to be inserted at the joints, extensions on the wedges adapted to overlap and cover the joints, and springs tending to expand the wedges.

2. In a piston, piston-valve or like packing, a plurality of segmental packing rings having wedging surfaces on their adjacent faces and arranged with their joints in axial alinement, a plurality of radial wedges adapted to be inserted at the joints, recessed shanks on the wedges, and helical springs with flattened sides, mounted to operate in the shanks.

3. In a piston, piston-valve or like packing, a plurality of segmental packing rings having wedging surfaces on their adjacent faces and arranged with their joints in axial alinement, a plurality of radial wedges adapted to be inserted at the joints, extensions on the wedges adapted to overlap and cover the joints, springs tending to expand the wedges, spring-pressed plugs adapted to support the packing ring segments intermediate their ends, and segmental extensions on the plugs.

4. In a piston, piston-valve or like packing, a plurality of segmental packing rings having wedging surfaces on their adjacent faces and arranged with their joints in axial alinement, a plurality of radial wedges adapted to be inserted at the joints, extensions on the wedges adapted to overlap and cover the joints, springs tending to expand the wedges, and means for retaining the tips of the wedges within the perimeters of the packing rings.

In testimony whereof I have affixed my signature, in presence of two witnesses.

ROBERT ALLEN.

Witnesses:
 ALBERT JONES,
 H. D. JAMESON.